(12) United States Patent
Evans

(10) Patent No.: US 8,179,549 B1
(45) Date of Patent: May 15, 2012

(54) METHOD AND SYSTEM FOR EMAIL-BASED PRINTING

(75) Inventor: Cary D. E. Evans, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 954 days.

(21) Appl. No.: 12/185,563

(22) Filed: Aug. 4, 2008

(51) Int. Cl.
  *G06F 15/00* (2006.01)
  *H04N 1/00* (2006.01)
(52) U.S. Cl. ................................. 358/1.15; 358/402
(58) Field of Classification Search .............. 358/1.15, 358/1.16, 1.18, 1.13, 1.14, 402, 444; 709/223, 709/224, 226, 206, 217; 713/179, 187, 156; 379/93.03, 93.02; 726/28
See application file for complete search history.

(56) References Cited

U.S. PATENT DOCUMENTS

2003/0182378 A1* 9/2003 Treptow et al. ............... 709/206

* cited by examiner

*Primary Examiner* — Saeid Ebrahimi Dehkordy
(74) *Attorney, Agent, or Firm* — Park, Vaughan, Fleming & Dowler LLP; Chia-Hsin Suen

(57) ABSTRACT

Some embodiments of the present invention provide a system that performs a print job. During operation, the system receives an email requesting the print job and determines, from the email, a printer associated with the print job. Next, the system configures the print job based on the email. Finally, the system sends the print job to the printer, wherein the print job is executed using the printer.

25 Claims, 6 Drawing Sheets

METHOD AND SYSTEM FOR EMAIL-BASED PRINTING

BACKGROUND

Related Art

Embodiments of the invention provide a method and system for email-based printing.

Printing is a necessity to many businesses, schools, and/or other organizations. In particular, printing may be used to facilitate numerous aspects of an organization's activities. For example, documents may be printed within the organization for design, marketing, accounting, review, record keeping, planning, and/or notification purposes. However, significant costs may be incurred by the organization in implementing and providing print technology, including costs associated with the purchase of printing hardware and supplies as well as costs associated with maintenance and configuration of computers and printers within the organization's network.

Furthermore, provisioning and maintaining printing services for the organization may require an Information Technology (IT) infrastructure that is complicated and non-user-friendly. For example, configuring a single new printer may require printer drivers for the printer to be installed on all machines using the printer. Printer drivers may additionally be difficult to install or unavailable for certain operating systems. A user within the organization may thus have difficulty printing to a certain printer if the user's machine is not pre-configured to communicate with the printer and/or uses an unsupported operating system. Consequently, organizations may benefit from mechanisms that provide printing services to a variety of machines and operating systems while reducing cost and complexity.

SUMMARY

Some embodiments of the present invention provide a system that performs a print job. During operation, the system receives an email requesting the print job and determines, from the email, a printer associated with the print job. Next, the system configures the print job based on the email. Finally, the system sends the print job to the printer.

In some embodiments, the system also verifies a user requesting the print job prior to sending the print job to the printer.

In some embodiments, the user is verified using a sender email address or a sender email domain from the email.

In some embodiments, the system also replies to the email with a status associated with the print job.

In some embodiments, the status corresponds to at least one of a completed print job, a printer status, a print preview, an unsupported file type, help content, and a print error.

In some embodiments, configuring the print job involves:
(i) obtaining print content for the print job from the email;
(ii) converting the print content into printer-readable data;
(iii) specifying options for the print job based on the email; and
(iv) transmitting the printer-readable data and the options to the printer using a printer driver for the printer.

In some embodiments, the options are associated with a number of copies, a number of printing sides, collation, stapling, an ink type, a paper size, a paper type, a page orientation, or a printing range.

In some embodiments, the print content is obtained from an email attachment or a body of the email.

In some embodiments, the printer is determined from the email based on a recipient email address corresponding to the printer.

DETAILED DESCRIPTION

Figure 1:
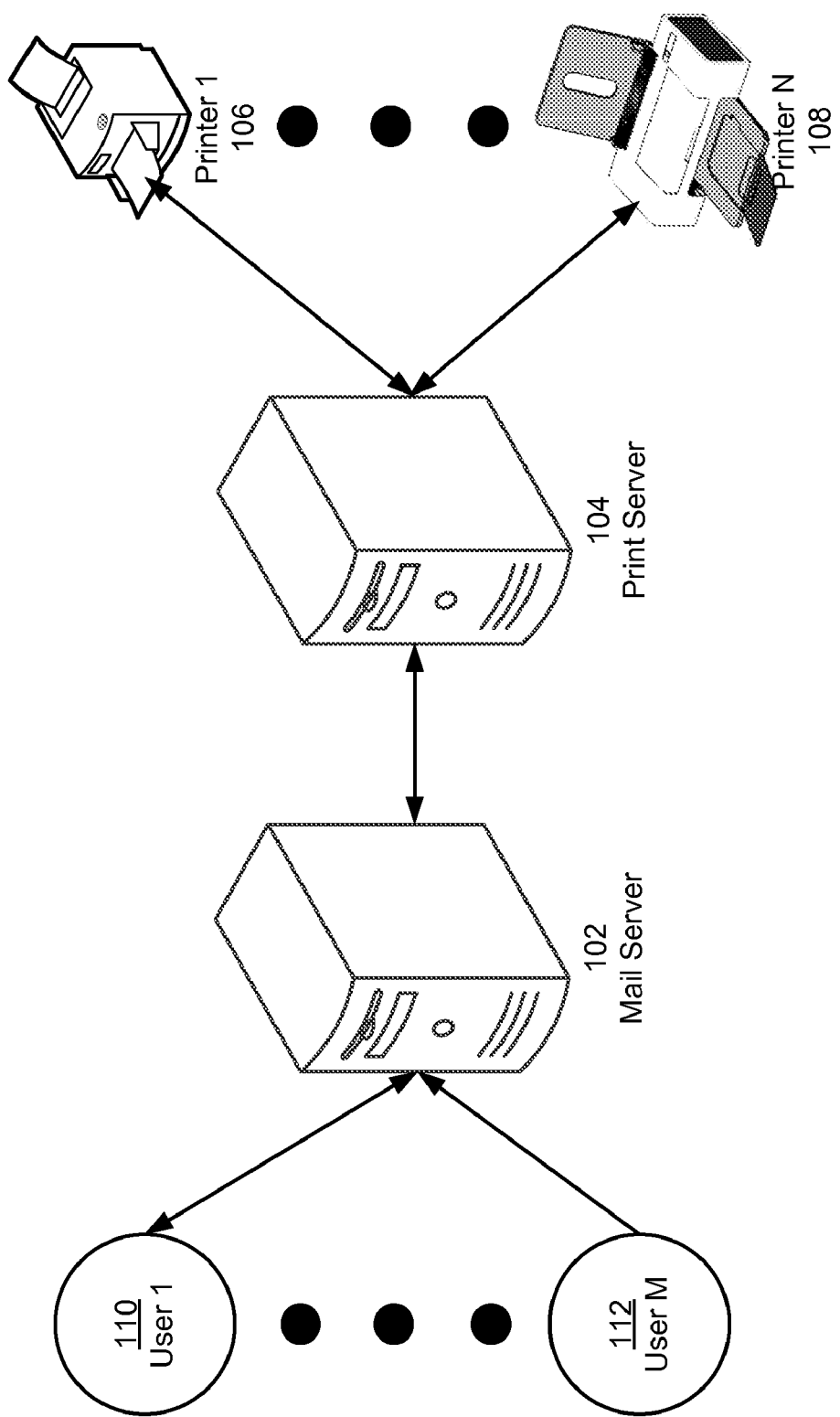
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the present invention provide a method and system for executing print jobs. The print jobs may be requested by users within an organization, such as a business, school, or company. The print jobs may also be sent to a variety of printers within the organization, including printers located in different floors, buildings, campuses, and/or cities associated with the organization. Each printer may be associated with a set of features, such as collation, stapling, double-sided printing, color printing, and/or different types and sizes of paper. Furthermore, print jobs may be directed to printers based on the features provided by each printer as well as the location of the users requesting the print jobs.

More specifically, embodiments of the present invention provide a method and system for email-based execution of print jobs. A print job may be requested using an email addressed to a recipient email address corresponding to a printer. The email may be processed by a print server to determine the printer corresponding to the print job and to configure the print job. The print job may then be sent to the printer for execution of the print job. As a result, users within the organization may print documents at various printer models and locations without a lengthy or complicated setup process.

FIG. 1 shows a schematic of a system in accordance with an embodiment of the present invention. The system may be used to provide printing services to users (e.g., user 1 110, user m 112). As shown in FIG. 1, the system includes a mail server 102, a print server 104, and a set of printers (e.g., printer 1 106, printer n 108). Each of these components is described in further detail below.

Print server 104 includes functionality to communicate with one or more printers (e.g., printer 1 106, printer n 108). In particular, the printers may correspond to network printers that are connected to print server 104 using a wired or wireless network connection. Alternatively, one or more printers may connect to print server 104 and/or other machines (e.g., personal computers (PCs)) as local peripherals using one or more printer cables.

In addition, print server 104 may process and configure requests for print jobs from one or more users (e.g., user 1 110, user m 112). The users may be associated with access rights to one or more printers connected to print server 104. For example, the users may correspond to members of an organization (e.g., business, school, company, etc.) that are authorized to use one or more printers connected to print server 104. Print server 104 may then send each print job to the appropriate printer, which executes the print job using settings provided by the user requesting the print job. For example, the user may provide a document to be printed and one or more options associated with printing the document, such as: a number of copies, a number of printing sides (e.g., single- or double-sided), collation, stapling, an ink type (e.g., black-and-white, color, etc.), a paper size (e.g., A4, letter, etc.), a paper type (e.g., glossy, matte, bond, colored, etc.), a page orientation, and/or a printing range (e.g., page range, selection, etc.).

In one or more embodiments of the invention, requests for print jobs are made by the users through emails. The emails may be received by mail server 102 and sent to print server 104 for processing. Print server 104 may then use the emails to determine printers associated with the print jobs, configure the print jobs, and/or verify the users prior to sending the print jobs to the respective printers. Email-based requests for print jobs are described below with respect to FIG. 3A.

More specifically, print server 104 may determine the printer associated with a print job from the recipient email address of the email requesting the print job. In other words, each printer connected to print server 104 may be associated with an email address. The email addresses for the printers may be displayed on the printers, listed in a directory that may be retrieved by the users, and/or otherwise accessed by the users. Print server 104 may similarly resolve a printer from the recipient email address of an email by finding an entry that matches the recipient email address from the user-accessible directory and/or an internally stored directory. On the other hand, emails requesting print jobs may be addressed to a recipient email address associated with print server 104, and the printer associated with each print job may be included in the subject line or body of the email. If no printer is specified in the email, print server 104 may either respond to the email with an error message or select a printer that is closest to the user based on, for example, the Internet Protocol (IP) address of the email's sender.

Once the printer associated with the print job is identified, a print job for the printer may be created and configured by print server 104 from the email. To configure the print job, print server 104 may obtain print content for the print job from the email. The print content may be obtained from one or more email attachments in the email. For example, the user requesting the print job may include one or more word processor documents, spreadsheets, Portable Document Format (PDF) files, images, and/or other printable documents. Alternatively, the print content may be included in the body of the email if no attachments are included and/or the user has specified additional content to be printed. For example, the user may copy and paste the contents of a text file, word processor document, image, and/or other data into the body of the email for printing.

The print content may then be converted into printer-readable data by print server 104 in preparation for transmission to the printer. More specifically, print server 104 may include mechanisms for reading a variety of printable file formats, such as PDF files, emails, HyperText Markup Language (HTML) documents, word processor documents, spreadsheets, images, text files, and/or computer-aided design (CAD) files. To prepare for printing, print server 104 may convert the print content from the email to bitmapped images, vector images, character strings, and/or other printer-readable data for use by the printer. Alternatively, print server 104 may use a page description language (PDL) such as PostScript (PostScript™ is a registered trademark of Adobe Systems, Inc.) to convert the files to PDL programs that are transmitted to the printer associated with the print job. A PDL interpreter on the printer may then print the files by executing the PDL programs associated with the files.

Options for the print job may also be obtained from the email. As described above, the options may include a number of pages, single- or double-sided printing, collation, stapling, black-and-white or color printing, paper size, paper type, page orientation, print range, and/or other configurable options associated with the printer. The options may be included using keywords within the email sent by the user. Furthermore, because the availability of options may differ between computers, print server 104 may include functionality to provide a list of options associated with a printer to the user. In one or more embodiments of the invention, the list of options is sent to the user through an email generated by print server 104. Email-based descriptions of options for printing are discussed in further detail below with respect to FIG. 3B.

Furthermore, print server 104 may verify the user requesting the print job prior to sending the print job to the printer. In other words, print server 104 may verify that the user is authorized to print to the printer. The verification may be accomplished using a sender email address of the email and/or a sender email domain of the email. For example, print server 104 may access a list of email addresses that are authorized to print to some or all of the printers. Alternatively, all email addresses within a certain email domain (e.g., an organization's email domain) may be permitted to print documents using print server 104.

Those skilled in the art will appreciate that verification of users may also be performed by mail server 102 and/or another mechanism. For example, mail server 102 may perform filtering on emails to print server 104. In other words, mail server 102 may only route emails from a set of authorized email addresses and/or email domains to print server 104 for the processing and execution of print jobs. Along the same lines, filtering mechanisms may only allow emails that originate within an intranet (e.g., an organization's intranet) associated with mail server 102 and/or print server 104 to reach print server 104.

Those skilled in the art will also appreciate that the system of FIG. 1 may include multiple mail servers and/or print servers. For example, multiple mail servers may be used to implement email functionality within an organization and route messages between the users and print server 104. Multiple print servers may also be used to process print job requests associated with printers at various printer locations. For example, each print server may be configured to handle print job requests for printers within a building, campus, city, and/or other unit of division within an organization.

Once the print job is configured and the user requesting the print job verified, the print job is sent from print server 104 to the printer specified within the email using a printer driver for the printer. The print job may then be executed by the printer. Consequently, the system of FIG. 1 may allow users to utilize a variety of printers through a variety of machines and/or operating systems without requiring an extensive and complicated setup process for each machine with each printer.

Print server 104 may also reply to the email with a status associated with the print job. The status may correspond to a completed print job, a printer status, a print preview, an unsupported file type, help content, and/or a print error. For example, print server 104 may reply to an email requesting a print job when the print job is finished executing or the printer has encountered a print error that prevents the print job from executing. Print server 104 may also send a reply if the user includes an attachment of an unsupported file type. Print server 104 may also communicate with the users outside of requests for print jobs. For example, a user may send an email requesting a print preview and/or help content; print server 104 may reply with the requested information, such as a PDF corresponding to the print preview or a list of commands associated with a particular printer.

Figure 2:
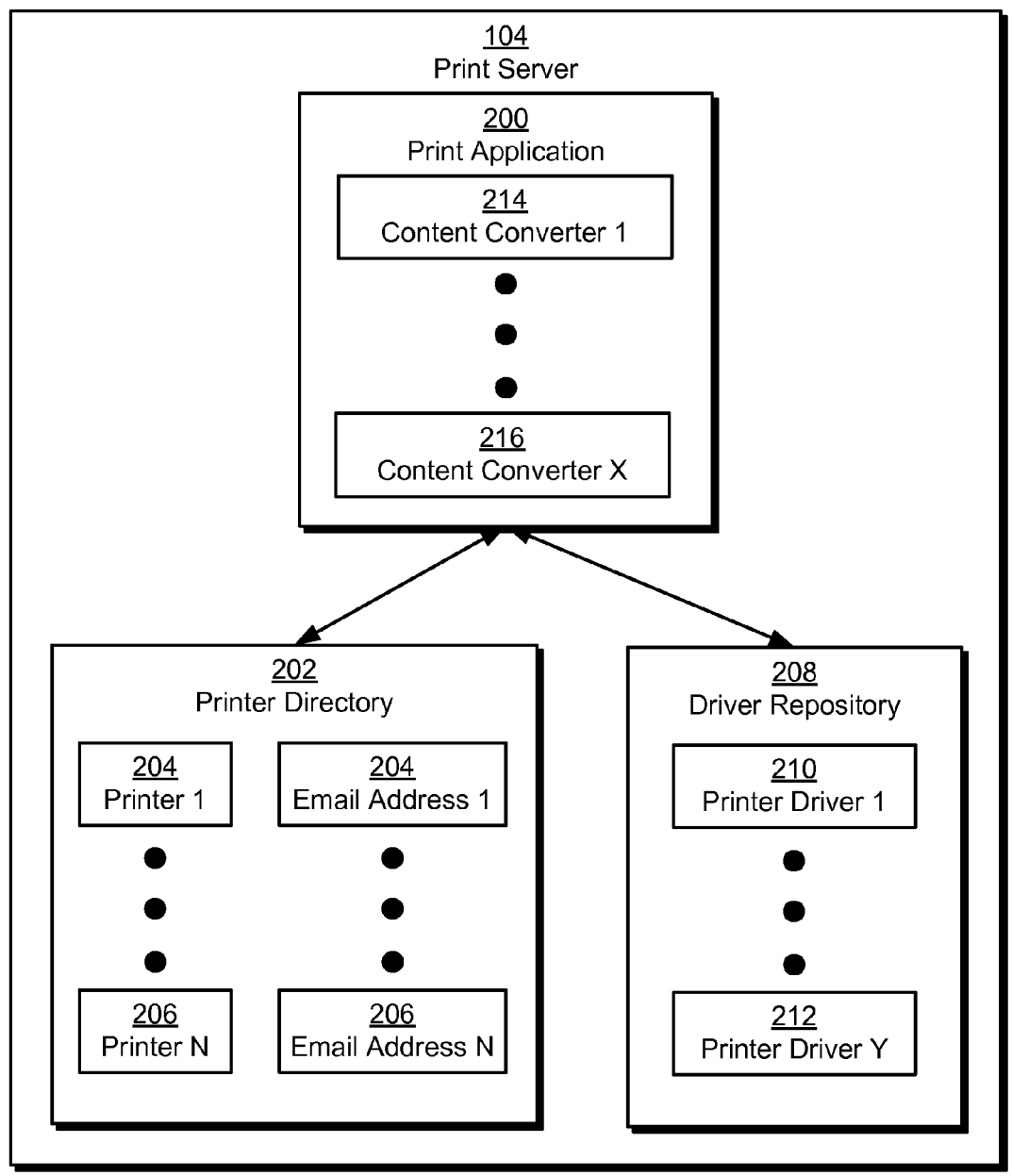
FIG. 2 shows a print server in accordance with an embodiment of the present invention.

FIG. 2 shows print server 104 in accordance with an embodiment of the present invention. Print server 104 includes a print application 200, a printer directory 202, and a driver repository 208. As discussed above, print server 104 may be used to process email-based requests for print jobs. More specifically, print application 200 may receive emails from users requesting the print jobs. Print application 200 may also create and configure print jobs using the emails.

As shown in FIG. 2, print application 200 includes a set of content converters (e.g., content converter 1 214, content converter x 216). The content converters may be used by print application 200 to convert various email attachments and/or other print content into printer-readable data, such as bitmapped images, vector images, and/or PDL programs. As a result, print server 104 may include support for file types that have corresponding content converters in print application 200.

Print application 200 may also determine a printer to which a print job is sent based on the email requesting the print job. As mentioned previously, the printer may be specified using a recipient email address corresponding to the printer. Once the email is received by print server 104, print application 200 may resolve the printer associated with the print job using printer directory 202. More specifically, printer directory 202 includes a list of printers (e.g., printer 1 204, printer n 206) and a list of email addresses (e.g., email address 1 204, email address n 206) corresponding to the printers. Print application 200 may match the recipient email address of the email with a printer listed in printer directory 202. Printer directory 202 may also include other information, such as an IP address associated with each printer, the model number of the printer, a description of the printer's features and functionality, a reference to a printer driver (e.g., printer driver 1 210, printer driver y 212) for the printer, and the printer's location (e.g., room, floor, building, city, etc.).

The list of printers in printer directory 202 may correspond to printers connected to print server 104, such as the printers shown in FIG. 1. If a new printer is connected to print server 104, an entry for the printer and a corresponding email address is added to printer directory 202. Similarly, if a printer is taken offline, the entry for the printer may be flagged or removed from printer directory 202.

After configuring the print job using the print content and/or options specified in the email, print application 200 may send the print job to the printer using a printer driver (e.g., printer driver 1 210, printer driver y 212) for the printer from driver repository 208. Because printers of the same or related models may use the same printer driver, the number of printer drivers in driver repository 208 may differ from the number of printers connected to print server 104 and/or listed in printer directory 202. Print application 200 may also use a printer driver to receive communications from a printer. The communications may then be relayed to the user through an email reply to the user. For example, the email reply may include a print status, printer status, help content, and/or a print preview of the print content.

Figure 3A:
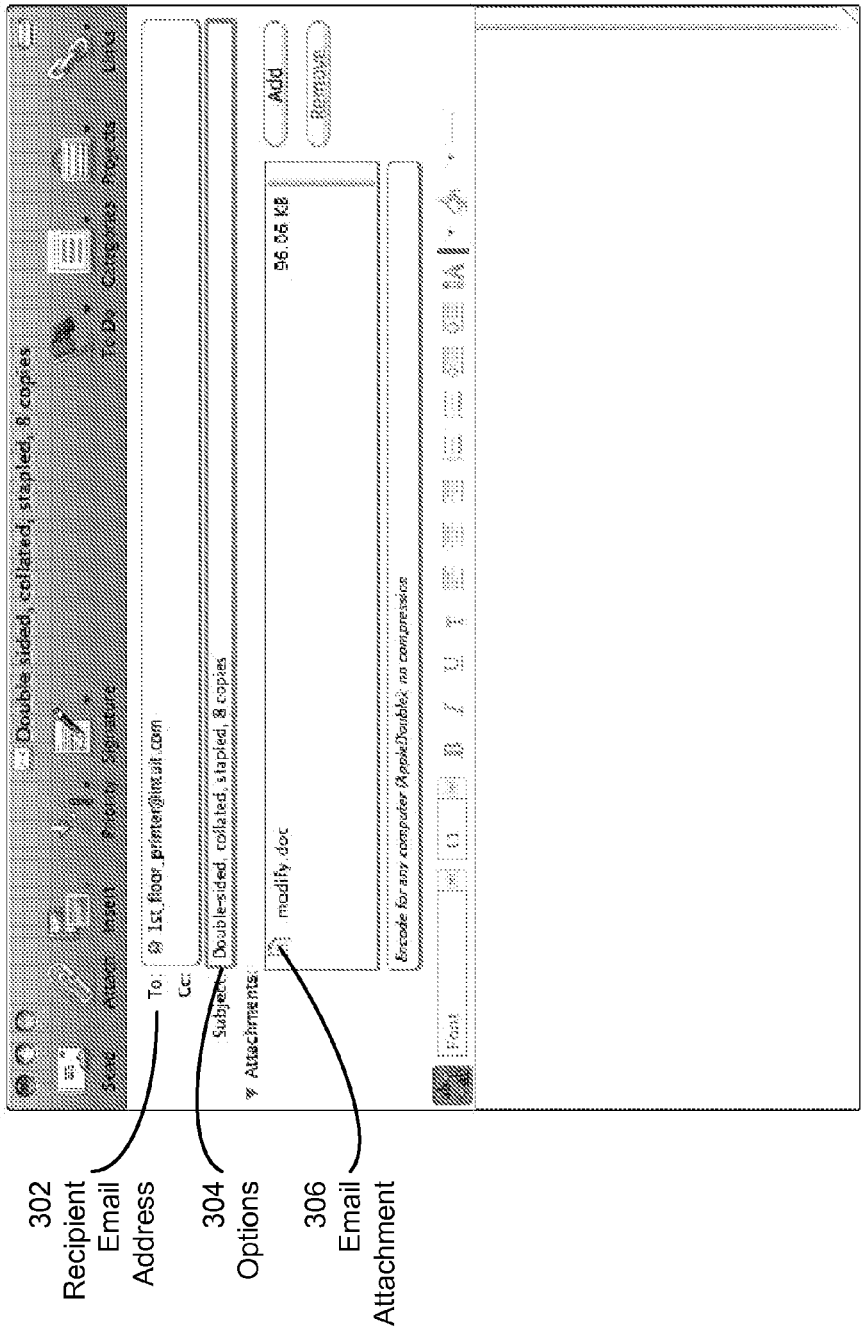
FIG. 3A shows an exemplary email in accordance with an embodiment of the present invention.

FIG. 3A shows an exemplary email in accordance with an embodiment of the present invention. More specifically, FIG. 3A shows an email requesting a print job in accordance with an embodiment of the present invention. The email may be processed by a print server (e.g., print server 104 of FIGS. 1 and 2) to configure a print job for a user sending the email. The print server may then send the print job to a printer for execution of the print job.

As shown in FIG. 3A, the email includes a recipient email address 302 of "1st_floor_printer@intuit.com." Recipient email address 302 may be used to determine the printer associated with the print job. For example, recipient email address 302 may correspond to a printer located in the first floor of a building in an organization. Moreover, the email domain of recipient email address 302 may correspond to the organization's email domain.

A set of options 304 associated with the print job is additionally specified in the subject line of the email. In particular, options 304 (i.e., "Double-sided, collated, stapled, 8 copies") for the print job indicate that the print job should include double-sided printing, collation, stapling, and eight copies.

Finally, an email attachment 306 named "modify.doc" is included in the email as print content for the print job. Print content may also be included in the body of the email in addition to or in lieu of email attachment 306. For example, the user may copy and paste the contents of email attachment 306 into the body of the email instead of including email attachment 306 in the email. The user may also include text describing email attachment 306 (e.g., as a cover sheet) in the body of the email for printing with email attachment 306.

Figure 3B:
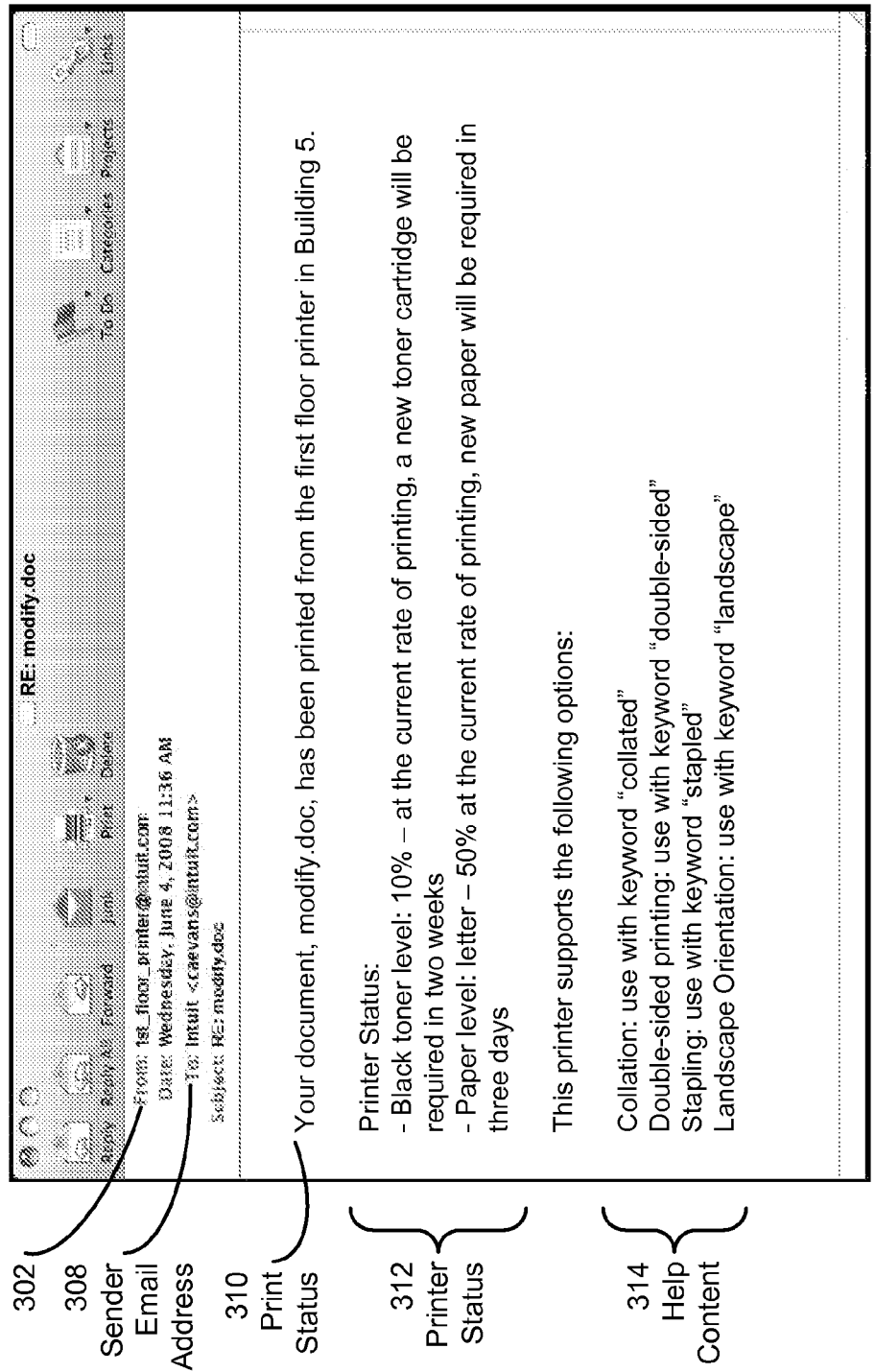
FIG. 3B shows an exemplary email in accordance with an embodiment of the present invention.

FIG. 3B shows an exemplary email in accordance with an embodiment of the present invention. More specifically, FIG. 3B shows an email reply to the email of FIG. 3A. The email reply may be generated by the print server to provide the user with status information associated with the print job requested by the user. As a result, the email reply is sent from recipient email address 302 corresponding to the printer and addressed to a sender email address 308 corresponding to the sender of the email of FIG. 3A.

The email reply of FIG. 3B also includes a print status 310 of the print job. In particular, print status 310 states, "Your document, modify.doc, has been printed from the first floor printer in Building 5." In other words, print status 310 informs the user that the requested print job is complete. Print status 310 also provides information regarding the location of the printer associated with the print job to facilitate pickup of the printed document by the user.

The email reply also includes a printer status 312 of the printer associated with the print job. Printer status 312 includes toner and paper levels for the printer, as well as predicted timelines for replacement of the printer's toner cartridge and paper at current rates of printing. Printer status 312 may also include other information, such as the printer's model, the printer's serial number, and/or other usage statistics associated with the printer.

Finally, the email reply includes help content 314 associated with the printer. Help content 314 includes options for printing that are supported by the printer, such as collation, double-sided printing, stapling, and a landscape paper orientation. Help content 314 additionally provides keywords that may be included in email-based print job requests to specify the options. As discussed above, help content 314 may be sent to the user independently of a print job request by the user. For example, help content 314 may be included in an email reply to an email addressed to recipient email address 302 that includes the word "help" in the subject line.

Figure 4:
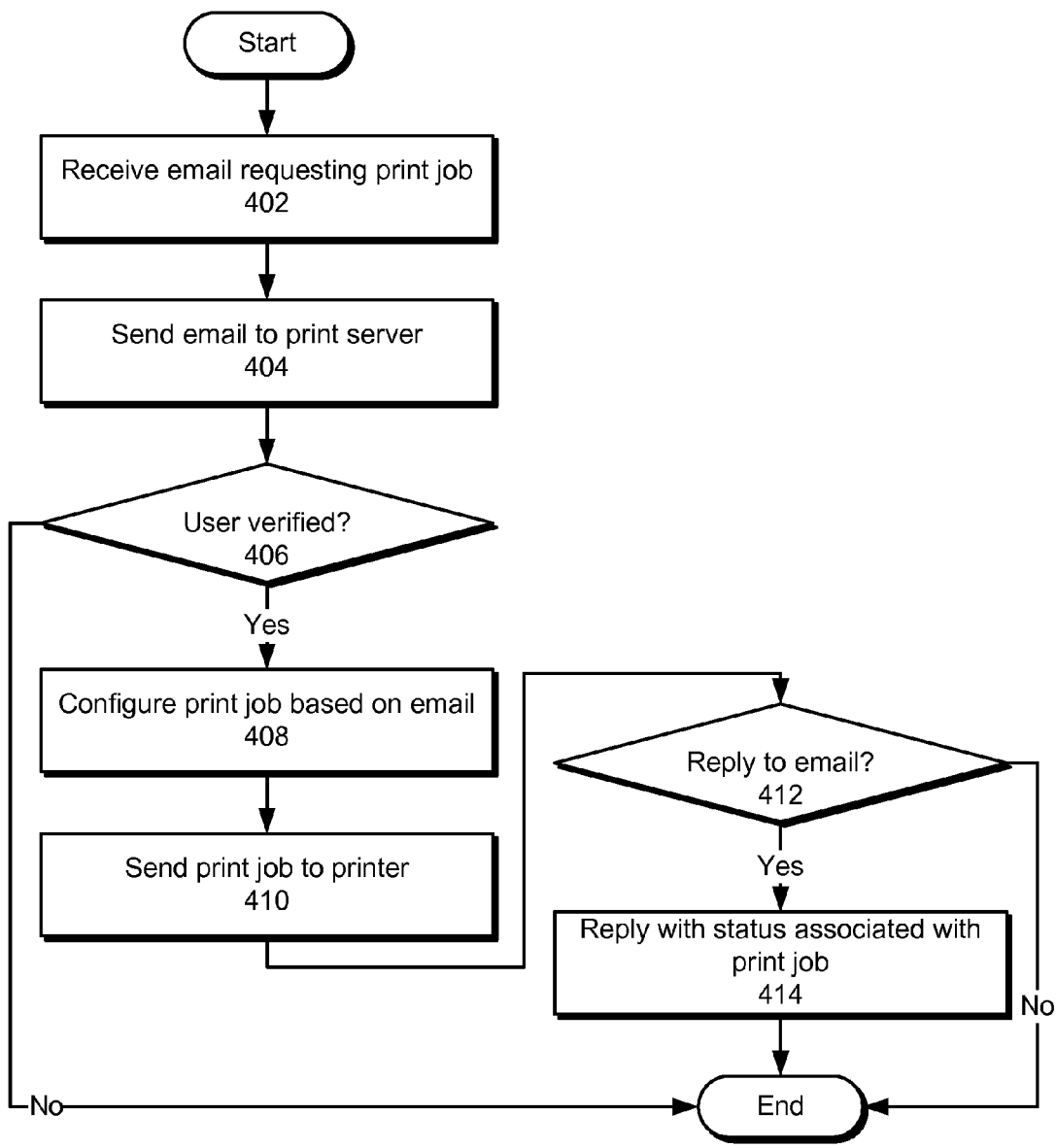
FIG. 4 shows a flowchart illustrating the process of email-based printing in accordance with an embodiment of the present invention.

FIG. 4 shows a flowchart illustrating the process of email-based printing in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

Initially, an email requesting a print job is received (operation 402). The email may be sent by a user requesting the print job. In addition, the email may be addressed to a recipient email address corresponding to a printer the user would like to use for the print job. The email is then sent to a print server (operation 404) for configuration of the print job.

The user may be verified (operation 406) prior to executing the print job. In particular, the user may be verified for access privileges associated with the printer. Furthermore, the user may be verified using the sender email address and/or sender email domain of the email. If the user is not permitted to use the printer, the print job is not configured or executed. If the user is verified, the print job is configured based on the email (operation 408). The print job is then sent to the printer (operation 410), where the print job may be executed.

An email reply (operation 412) may be generated and sent to the user. The email reply may include status information associated with the print job. If no reply is needed, no further action is taken. For example, no email reply may be made if status notifications for the print job are turned off. However, if an email reply is needed, the email reply is sent to the user with the status of the print job (operation 414). For example, the email reply may notify the user that the print job has completed, or that the print job cannot complete because of an unsupported file type or print error (e.g., paper jam, lack of ink, etc.). The email reply may also include status information associated with the printer, help content, and/or a print preview of the print job. Each component of the email reply may be requested by the user or automatically included.

Figure 5:
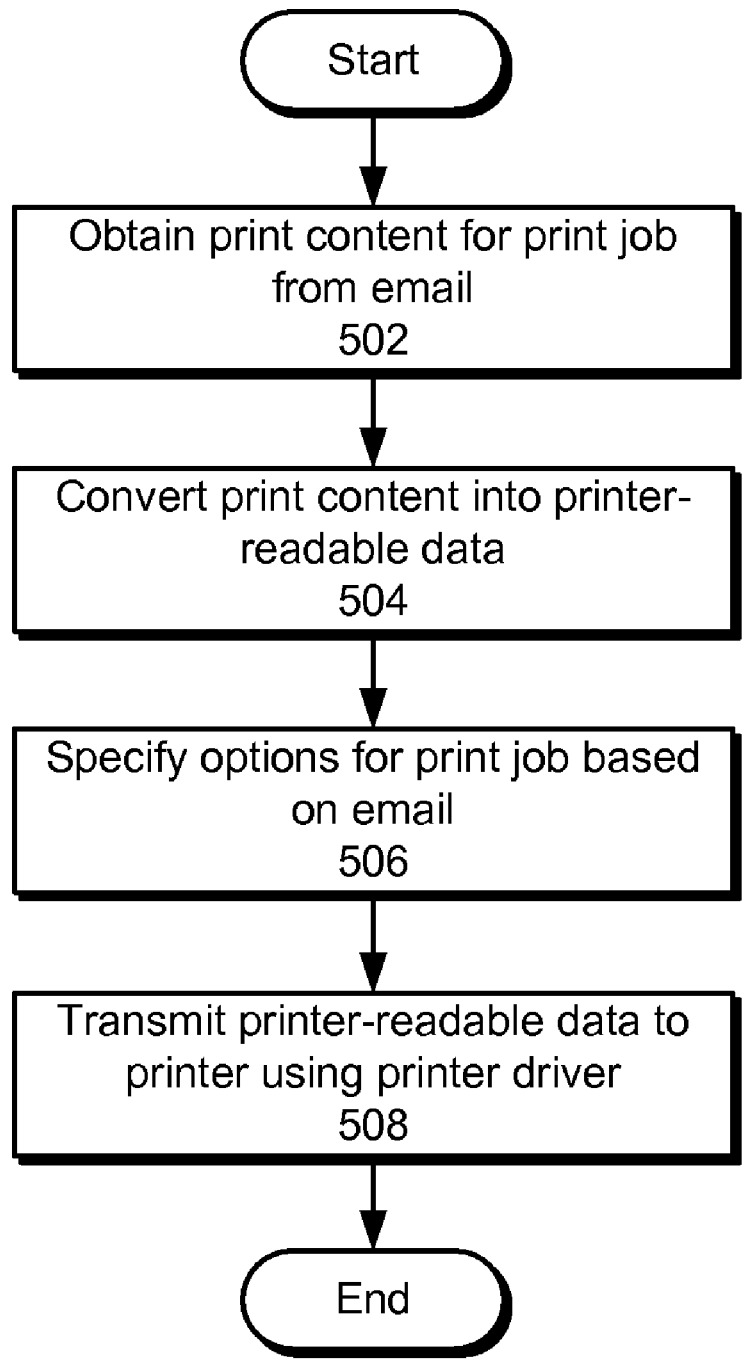
FIG. 5 shows a flowchart illustrating the process of configuring a print job in accordance with an embodiment of the present invention.

FIG. 5 shows a flowchart illustrating the process of configuring a print job in accordance with an embodiment of the present invention. In one or more embodiments of the invention, one or more of the steps may be omitted, repeated, and/or performed in a different order. Accordingly, the specific arrangement of steps shown in FIG. 5 should not be construed as limiting the scope of the invention.

First, print content for the print job is obtained from the email requesting the print job (operation 502). The print content may be included in one or more email attachments in the email and/or obtained from the body of the email. The print content is then converted into printer-readable data (operation 504), such as a bitmapped image, vector image, and/or PDL program.

Options for the print job are also specified based on the email (operation 506). The options may be based on the functionality of the printer. The options may also be specified using keywords within the email. Furthermore, the options may be associated with a number of copies, a number of printing sides, collation, stapling, an ink type, a paper size, a paper type, a page orientation, and/or a printing range. Finally, the printer-readable data is transmitted to the printer using a printer driver for the printer (operation 508).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing a print job, comprising:
    receiving an email requesting the print job, wherein the email comprises one or more job options associated with at least one of a number of copies, a number of printing sides, collation, stapling, an ink type, a paper size, a paper type, a page orientation, and a printing range;
    determining, from the email, a printer associated with the print job;
    configuring the print job based on the email by specifying options for the print job based on the job options; and
    sending the print job to the printer, wherein the print job is executed using the printer.

2. The computer-implemented method of claim 1, further comprising:
    verifying a user requesting the print job prior to sending the print job to the printer.

3. The computer-implemented method of claim 2, wherein the user is verified using at least one of a sender email address and a sender email domain from the email.

4. The computer-implemented method of claim 1, further comprising:
    replying to the email with a status associated with the print job.

5. The computer-implemented method of claim 4, wherein the status corresponds to at least one of a completed print job, a printer status, a print preview, an unsupported file type, help content, and a print error.

6. The computer-implemented method of claim 1, wherein configuring the print job further involves:
    obtaining print content for the print job from the email;
    converting the print content into printer-readable data; and transmitting the printer-readable data and the options to the printer using a printer driver for the printer.

7. The computer-implemented method of claim 6, wherein the print content is obtained from at least one of an email attachment and a body of the email.

8. The computer-implemented method of claim 1, wherein the printer is determined from the email based on a recipient email address corresponding to the printer.

9. The computer-implemented method of claim 1, further comprising sending a reply to the email, wherein the reply comprises one or more options associated with the printer.

10. A system for performing a print job, comprising:
 a mail server configured to:
  receive an email requesting the print job, wherein the email comprises one or more job options associated with at least one of a number of copies, a number of printing sides, collation, stapling, an ink type, a paper size, a paper type, a page orientation, and a printing range; and
  send the email to a print server;
 a set of one or more printers connected to the print server; and the print server configured to:
  determine, from the email, a printer associated with the print job from the set of printers;
  configure the print job based on the email by specifying options for the print job based on the job options; and
  send the print job to the printer, wherein the print job is executed using the printer.

11. The system of claim 10, wherein the print server is further configured to:
 verify a user requesting the print job prior to sending the print job to the printer.

12. The system of claim 11, wherein the user is verified using at least one of a sender email address and a sender email domain from the email.

13. The system of claim 10, wherein the print server is further configured to:
 reply to the email with a status associated with the print job.

14. The system of claim 13, wherein the status corresponds to at least one of a completed print job, a printer status, a print preview, an unsupported file type, help content, and a print error.

15. The system of claim 10, wherein configuring the print job further involves:
 obtaining print content for the print job from the email;
 converting the print content into printer-readable data; and
 transmitting the printer-readable data and the options to the printer using a printer driver for the printer.

16. The system of claim 15, wherein the print content is obtained from at least one of an email attachment and a body of the email.

17. The system of claim 10, wherein the printer is determined from the email based on a recipient email address corresponding to the printer.

18. A non-transitory computer-readable storage medium storing instructions that when executed by a computer cause the computer to perform a method for performing a print job, the method comprising:
 receiving an email requesting the print job, wherein the email comprises one or more job options associated with at least one of a number of copies, a number of printing sides, collation, stapling, an ink type, a paper size, a paper type, a page orientation, and a printing range;
 determining, from the email, a printer associated with the print job;
 configuring the print job based on the email by specifying options for the print job based on the job options; and
 sending the print job to the printer, wherein the print job is executed using the printer.

19. The computer-readable storage medium of claim 18, the method further comprising:
 verifying a user requesting the print job prior to sending the print job to the printer.

20. The computer-readable storage medium of claim 19, wherein the user is verified using at least one of a sender email address and a sender email domain from the email.

21. The computer-readable storage medium of claim 18, the method further comprising:
 replying to the email with a status associated with the print job.

22. The computer-readable storage medium of claim 21, wherein the status corresponds to at least one of a completed print job, a printer status, a print preview, an unsupported file type, help content, and a print error.

23. The computer-readable storage medium of claim 18, wherein configuring the print job further involves:
 obtaining print content for the print job from the email;
 converting the print content into printer-readable data; and
 transmitting the printer-readable data and the options to the printer using a printer driver for the printer.

24. The computer-readable storage medium of claim 23, wherein the print content is obtained from at least one of an email attachment and a body of the email.

25. The computer-readable storage medium of claim 18, wherein the printer is determined from the email based on a recipient email address corresponding to the printer.

* * * * *